United States Patent
Norman et al.

(10) Patent No.: US 7,222,684 B2
(45) Date of Patent: May 29, 2007

(54) SYSTEM, APPARATUS, AND METHOD FOR PROVIDING CONTROL OF A TOY VEHICLE

(75) Inventors: David A. Norman, Greenville, TX (US); Robert H. Mimlitch, III, Rowlett, TX (US); Richard Torrance, Greenville, TX (US)

(73) Assignee: Innovation First, Inc., Greenville, TX (US)

( * ) Notice: Subject to any disclaimer, the term of this patent is extended or adjusted under 35 U.S.C. 154(b) by 0 days.

(21) Appl. No.: 10/076,795

(22) Filed: Feb. 12, 2002

(65) Prior Publication Data

US 2002/0121395 A1 Sep. 5, 2002

Related U.S. Application Data

(60) Provisional application No. 60/268,447, filed on Feb. 12, 2001.

(51) Int. Cl.
*B60K 1/00* (2006.01)
(52) U.S. Cl. .................. 180/65.1; 446/465; 446/484
(58) Field of Classification Search ............ 180/65.1, 180/908, 167, 170, 174
See application file for complete search history.

(56) References Cited

U.S. PATENT DOCUMENTS

| | | | | |
|---|---|---|---|---|
| 3,732,751 A | * | 5/1973 | Berman et al. ............... 475/2 |
| 4,334,221 A | * | 6/1982 | Rosenhagen et al. .......... 463/6 |
| 4,336,858 A | * | 6/1982 | Loyzim ..................... 180/179 |
| 4,341,982 A | * | 7/1982 | Lahti et al. .................. 318/51 |
| 5,056,613 A | * | 10/1991 | Porter et al. ................ 180/178 |
| 5,172,665 A | * | 12/1992 | Kuroda .................. 123/339.22 |
| 5,349,276 A | * | 9/1994 | Mezzatesta et al. ........ 318/268 |
| 5,453,672 A | * | 9/1995 | Avitan ........................ 318/493 |
| 5,762,532 A | * | 6/1998 | Ishizuka et al. ............. 446/457 |
| 5,951,362 A | * | 9/1999 | Siu ............................. 446/462 |
| 5,994,853 A | * | 11/1999 | Ribbe .......................... 318/16 |
| 6,287,167 B1 | * | 9/2001 | Kondo ........................ 446/454 |
| 6,468,127 B1 | * | 10/2002 | Lee ............................. 446/457 |
| 6,591,178 B2 | * | 7/2003 | Krueger et al. ............... 701/83 |

* cited by examiner

*Primary Examiner*—Christopher P. Ellis
*Assistant Examiner*—Bridget Avery
(74) *Attorney, Agent, or Firm*—Fish & Richardson P.C.

(57) ABSTRACT

A system, apparatus, and method for providing a soft-start for a toy vehicle configured to be operated by a person. The method includes receiving a throttle signal operable to induce motion via a motor operating as a drive mechanism of the toy vehicle. A transition signal may be generated based on the throttle signal. The transition signal may be applied to effect operation of the motor. The transition signal may be a pulse width modulated signal having a duty cycle between 20 and 100 percent to provide for an acceleration that avoids the problems of conventional control systems. The transition signal may be ramped in a linear or non-linear fashion. The system may couple the soft-start control circuit between a ground terminal of a battery of the toy vehicle and motor(s), thereby allowing the soft-start control circuit to operate on a low voltage (i.e., not the high voltage of the battery).

40 Claims, 13 Drawing Sheets

SYSTEM, APPARATUS, AND METHOD FOR PROVIDING CONTROL OF A TOY VEHICLE

CROSS-REFERENCES TO RELATED APPLICATIONS

This Application for Patent claims the benefit of priority from, and hereby incorporates by reference for any and all purposes the entire disclosure of, co-pending U.S. Provisional Application for Patent having Ser. No. 60/268,447, filed Feb. 12, 2001.

BACKGROUND OF THE INVENTION

1. Technical Field of the Invention

The principals of the present invention generally relate to toy vehicles that may be ridden by people, and more specifically, but not by way of limitation, to a system, apparatus, and method for softening the initiation of motion of the toy vehicle.

2. Description of Related Art

As shown in FIG. 1, toy vehicles 100 for riding on or in have become popular for operators 110, such as children. The toy vehicles 100 may generally include ride-on and ride-in vehicles, including, but not limited to, automobiles, trucks, boats, airplanes, scooters, etc. Conventional control systems for the toy vehicles 100 have typically been limited to applying a direct current (DC) from a DC battery to a motor upon pressing or otherwise operating a "gas" pedal or other throttle mechanism. This type of control, however, basically operates as an on/off switch. In other words, when the pedal is pressed, the motor is applied a voltage for full power (i.e. maximum angular velocity). One reason for such a simplistic design is cost reasons.

FIG. 2 is an exemplary block diagram of a conventional control system 200 for the toy vehicle 100. The conventional control system 200 includes a battery 205, foot pedal switch 210, forward/reverse switch 215 for direction control, hi/lo switch 220 for fast and slow speeds, and motors 225a and 225b. The toy vehicles 100 are typically limited to a battery 205 for a power source rather than using other fuel sources, such as gasoline. The battery 205 is coupled to a foot pedal switch 210, which operates to provide power from the battery 205 to other electrical components of the control system 200 via line 212. The battery 205 supplies battery voltage $V_{BATT}$. Additionally, the foot pedal switch 210 operates as a failsafe device that prevents power from incidentally or accidentally being applied to the motors 225 for safety purposes. To operate as a failsafe device, the foot pedal switch 210 is a "make or break" switch with a spring return to OFF as understood in the art. The foot pedal switch 210 is further coupled to the forward/reverse switch 215 via line 217 and generates a throttle signal 218.

The forward/reverse switch 215 receives battery power via line 217, is operable to switch the direction of the motors 225 from forward to reverse so as to operate the toy vehicle 100 forward or reverse, respectively. The forward/reverse switch produces two signals, FWD and REV, which are applied to the hi/lo switch 220 via lines 222a and 222b (collectively 222). The hi/low switch 220 is further coupled to the motors 225 and operable to drive the motors 225 in parallel or series to provide for high and low speed of the toy vehicle 100. Further, the hi/lo switch 220 is coupled to the negative terminal 227 of the battery 205, which is electrically coupled to the low side. As understood in the art, each of the components of the control system 200 receive power from the battery, but that power is relatively high for solid state electronics, thereby making alternative control systems difficult and too expensive for the toy industry to consider a viable option.

There exists several problems when utilizing the control system 200, or any other basic direct drive system for controlling toy vehicles 100. These problems may include (i) excessive acceleration, (ii) jerk, (iii) safety (e.g., controlling and flipping the vehicle at startup), and (iv) wearing of the mechanical components of the drive train for the toy vehicle 100. While each of these problems have existed in the toy vehicles 100 for a long period of time, the toy industry and makers of toy vehicles 100 are very cost sensitive due to consumer pricing demands and production costs. Solutions to these problems have been unavailable due in large part to pricing and technical concerns of toy manufacturers for the toy vehicles 100.

With regard to excessive acceleration (dV/dt) and jerk (dA/dt), the acceleration and jerk result in a whiplash effect on the operator 110 and passenger(s). In terms of wearing of the mechanical components, when the toy vehicle 100 changes direction from forward to reverse and vice versa, a complete stop is not required. As all gear drives have a certain amount of backlash (i.e., small amounts of gap between gear teeth), the gears allow the motor to turn in the opposite direction without applying force to the output (e.g., wheels) of the drive train until the entire backlash is reduced to zero, thereby subjecting the motors 225 and drive train to the full load at full speed at each change in direction. In other words, since the motor 225 has no significant initial resistance to movement in the opposite direction due to backlash, the motor 225 accelerates rapidly until the backlash is eliminated. The motor 225 is therefore moving at near full speed in the reverse direction while the vehicle is still moving in a high speed in the opposite direction. Once the backlash is eliminated, the input and output to the drive train are rotating in the opposite direction and the gears exert substantial forces on one another as the drive train suddenly reverses direction. These substantial forces tend to wear out the motors, gears, and other mechanical components in the drive train.

In terms of safety, toy vehicles 100, such as automobiles and scooters, have the ability to flip or turnover due to the excessive acceleration of the toy vehicle 100. Additionally, because of the high acceleration, the wheels are often unable to gain traction on the surface, especially a wet surface. The traction problem, too, may result in the toy vehicle 100 becoming uncontrollable for the operator 110 and passengers, especially children. Additionally, toy manufacturers have been developing toy vehicles 100 with more speed and power thereby resulting in the exacerbation of the problems identified above.

SUMMARY OF THE INVENTION

To overcome the problems and limitations of conventional control systems for toy vehicles, a soft-start control circuit may be integrated into the conventional control systems. The soft-start control circuit according to the principles of the present invention reduces or eliminates the above-identified problems, including excessive acceleration, jerk, flipping of the vehicle, and wearing of mechanical components. By integrating the soft-start control circuit into the existing control systems without having to redesign the fundamentals of the control systems, the toy makers quickly and easily may upgrade the toy vehicles for a cost that allows the toy to remain competitive within the consumer acceptable price range.

One embodiment according to the principals of the present invention includes a system and method for providing a soft start for a toy vehicle configured to be operated by a person. The method may include receiving a throttle signal operable to induce motion via a motor operating as a drive mechanism for the toy vehicle. A transition signal may be generated based on the throttle signal. The transition signal may be applied to affect operation of the motor. The transition signal may be a pulse width modulated signal having a duty cycle between 20 and 100 percent to provide for an acceleration that avoids the problems of conventional control systems and appears and feels more realistic. The transition signal may be ramped in a linear or non-linear fashion. The system according to the principles of the present invention may couple the soft-start control circuit between a negative terminal of a battery and motor(s) of the toy vehicle, thereby allowing the soft-start control circuit to switch a low-side voltage and not the high-side of the battery. A second embodiment according to the principals of the present invention includes a system and method for disabling a toy vehicle. According to the principles of the present invention, the method includes receiving an on/off signal indicative to turn on and off the motor. A switch signal is generated to apply to the motor to induce motion of the toy vehicle. Operation of the switch signal is monitored. An improper switch signal may be determined. The motor may be disengaged from the battery upon determining an improper switch signal.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE PRESENTLY PREFERRED EXEMPLARY EMBODIMENTS

The principals of the present invention provide for a soft-start control circuit capable of being integrated into a conventional control system for toy vehicles. The soft-start control circuit is operable to reduce excessive acceleration generated by the conventional control systems due to switching battery voltage directly to motor(s) of the toy vehicles. A soft-start circuit may utilize a processor for receiving signals from the conventional control system and applying a transition signal such that the motor(s) are not excessively accelerated. The transition signal is variable such that full power is not substantially instantaneously applied to the motor. In other words, the transition signal causes the motor to be ramped from no power to full power. In one embodiment, the soft-start control circuit is coupled between a ground terminal of a battery of the toy vehicle and a low-side terminal of the motor(s). The transition signal generated by the soft-start control circuit may be a pulse width modulation signal having a duty cycle between 20 and 100 percent, linearly (e.g., ramp) or non-linearly (e.g., exponential), at startup, thereby reducing or eliminating excessive acceleration. Additionally, the soft-start control circuit may include failsafe circuitry to provide the operator of the toy vehicle the ability to disable the motors of the vehicle for safety purposes.

Figure 1:
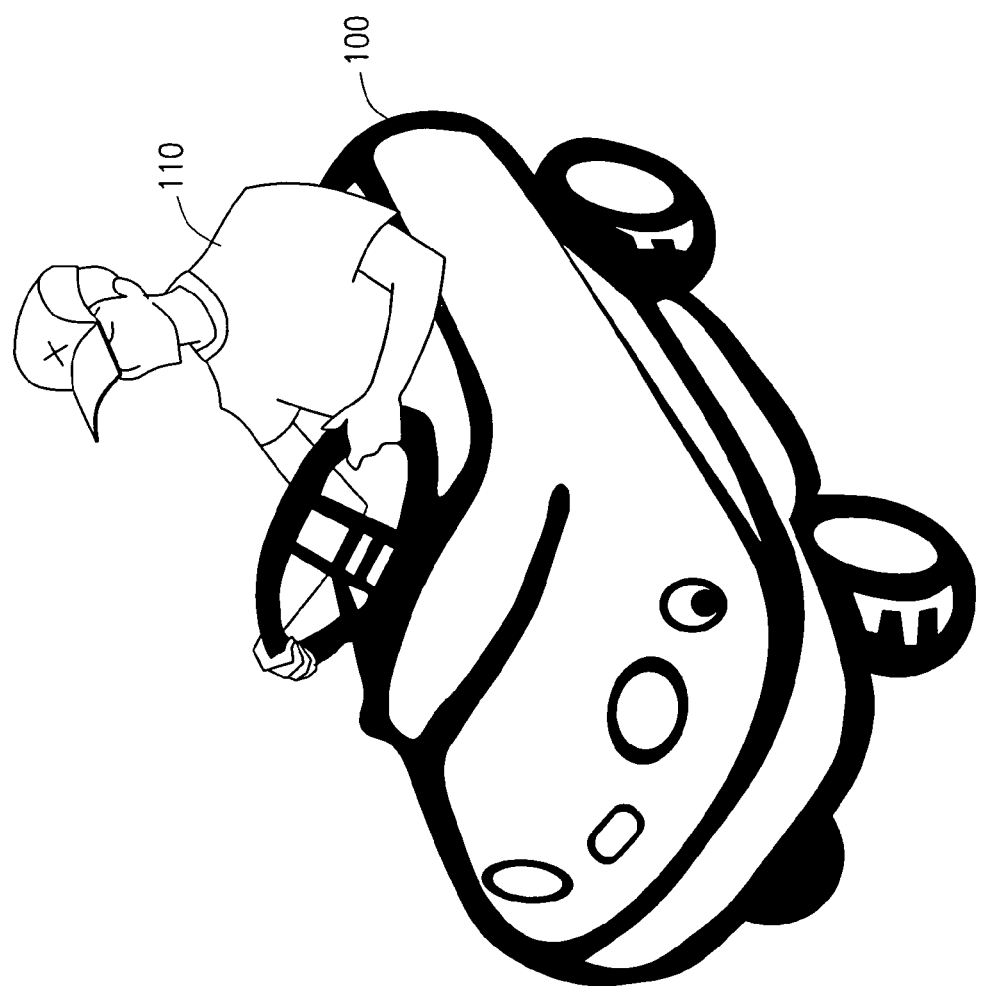
FIG. 1 is an exemplary toy vehicle being ridden by an operator, such as a child.
Figure 2:
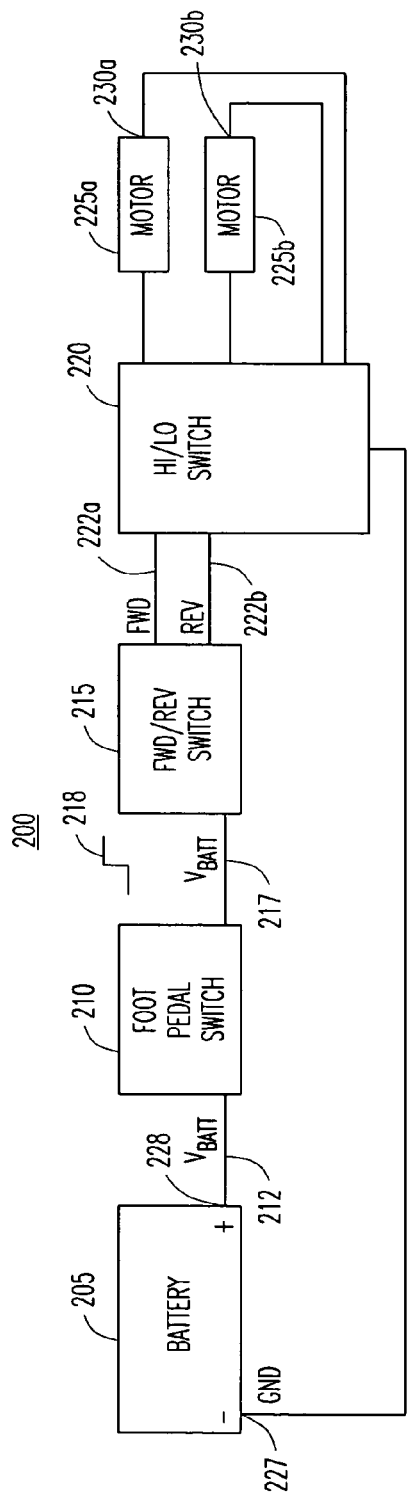
FIG. 2 is an exemplary block diagram of a conventional control system utilized by the toy vehicle of FIG. 1.
Figure 3:
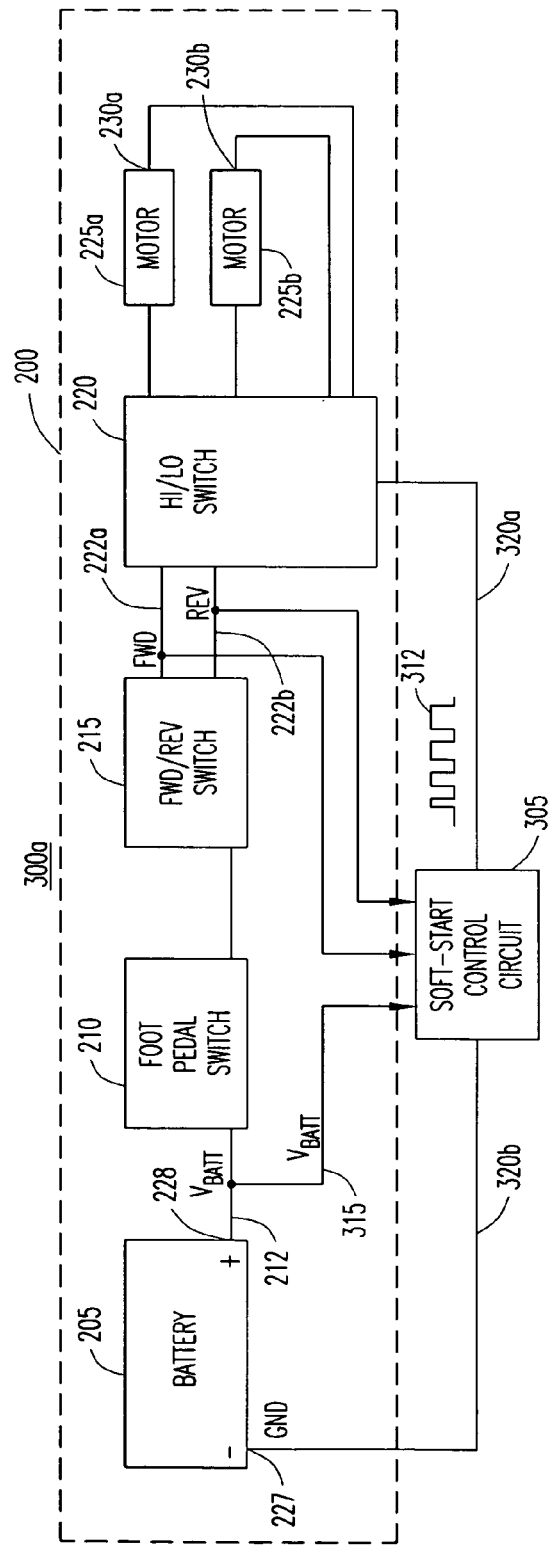
FIG. 3 is an exemplary block diagram including the conventional control system of FIG. 2 having a soft-start control circuit that incorporates the principles of the present invention integrated therewith.

FIG. 3 is an exemplary block diagram 300 including the conventional control system 200 having a soft-start control circuit 305 integrated therewith. As shown, the soft-start control circuit is coupled between the negative terminal 227 of the battery 205 and the hi/lo switch 220. The soft-start control circuit 305 further receives inputs of the positive terminal 228 of the battery 205 and forward and reverse signals 222a and 222b. The battery voltage $V_{BATT}$ simply provides operational power to the soft-start control circuit 305, and the forward and reverse signals 222 provide an indication that the foot pedal switch 210 is engaged and for indicating when a shift between forward and reverse occurs.

The soft-start control circuit 305 is operable to apply a transition signal 312 on the return path 320a and 320b (collectively 315) between the motors 225 and the battery 205.

The soft-start control circuit 305 is integrated in the return path 320 of the control system 300, however, it should be understood that the soft-start control circuit 305 could be included in the forward path (i.e., between the positive terminal 228 of the battery 205 and the motors 225) to affect the high-side voltage to the motors 225. However, by integrating the soft-start control circuit 305 in the return path 320, the circuitry is less complicated and less expensive due to not having to use field effect transistors as a high-side switch. Additionally, the soft-start control circuit 305 may be disabled via a jumper (e.g., switch) or altering control parameters, either by software or hardware, of the soft-start control circuit 305.

Figure 4:
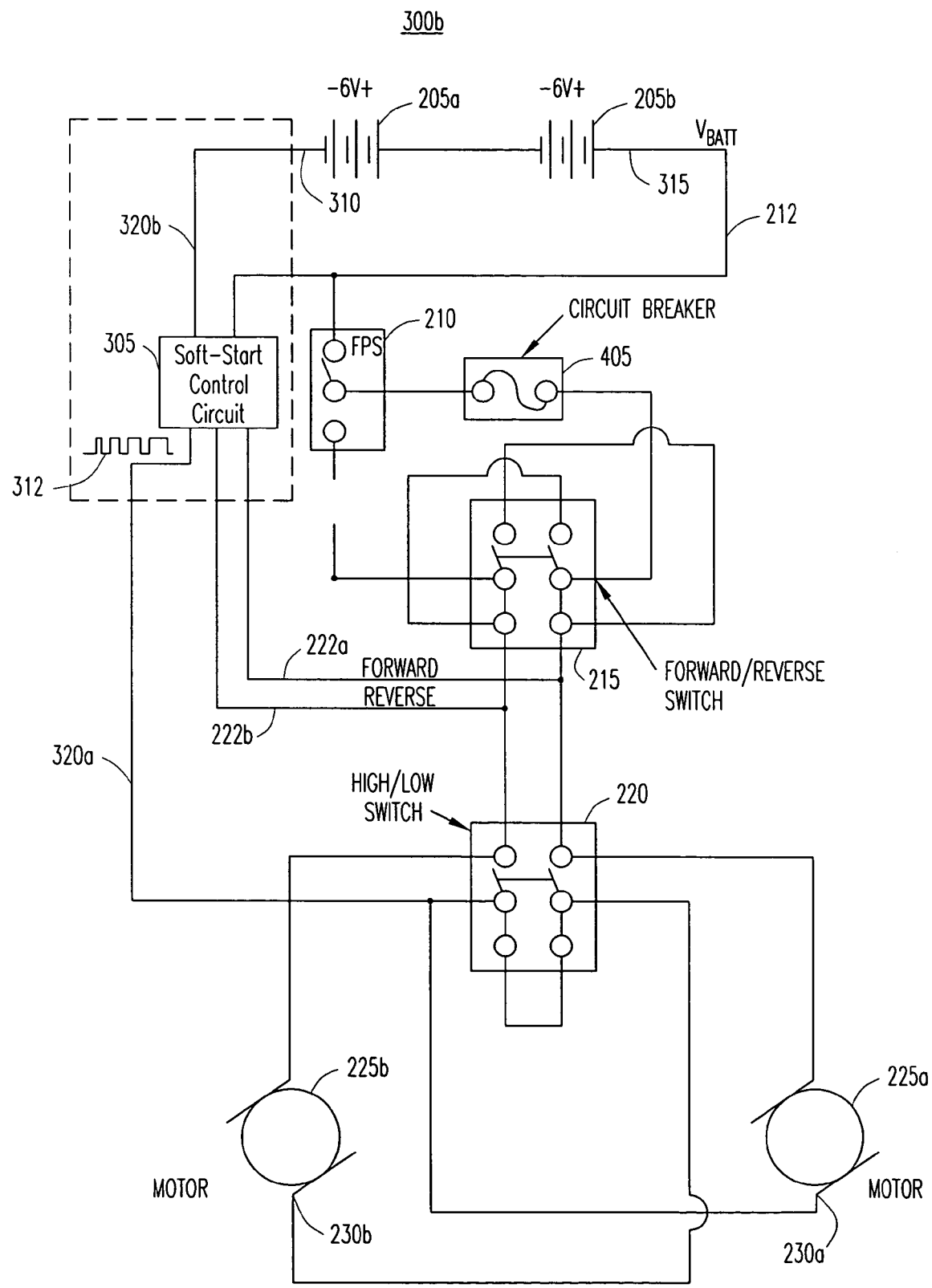
FIG. 4 is a more detailed exemplary block diagram of the control system for the toy vehicle providing the soft-start control circuit of FIG. 3.

FIG. 4 is a more detailed exemplary block diagram 300b of the control system for the toy vehicle 100 providing the soft-start control circuit 305. The six-volt batteries 205a and 205b are connected in series so as to provide for a total battery voltage $V_{BATT}$ of twelve volts, which is delivered to the foot pedal switch 210 and the soft-start control circuit 305 via line 212. Again, the soft-start control circuit 305 utilizes the battery voltage $V_{BATT}$ for a power supply, and does not switch the battery voltage $V_{BATT}$. If soft-start control circuit 305 were operating in the forward path of the control system, then the battery voltage $V_{BATT}$ would be switched. The foot pedal switch 210 is normally open such that when the passenger 110 running the toy vehicle 100 engages the foot pedal switch 210, a connection is made (i.e., the switch is closed) and the battery voltage is applied to the rest of the control system 300b. A circuit breaker 405 is utilized to prevent an overcurrent situation and to avoid damaging other electrical components or the motors 225.

The forward/reverse switch 215 is shown as being normally open. Upon the operator 110 shifting between forward and reverse, the forward/reverse switch 215 closes and the motors 225 are applied a reverse polarity to change driving direction of the toy vehicle 100. The forward and reverse signals 222a and 222b, are applied to the soft-start control circuit 305 for determining that the foot pedal switch 210 is engaged and for indicating when a shift between forward and reverse occurs. The hi/lo switch 220 is operable to allow the passenger 110 to shift the speed of the vehicle from low to high and vice-versa. Because the hi/lo switch 220 is normally open, the toy vehicle 100 is configured to be in low speed mode by operating the motors in series (i.e., each motor operates on six volts as understood in the art). Upon a shift from low to high speed, the hi/lo switch 220, which is a double-pole double-throw switch, configures the motors 225 to be operating in parallel, thereby operating both motors on twelve volts.

As shown, the soft-start control circuit 305 is coupled to the low-side of 230a and 230b of the motors 225 to allow the soft-start control circuit 305 to apply a transition signal 312 to the motors 225. The transition signal 312 operates to affect the angular velocity of the motors 225 by altering the average voltage being applied to or drawn by the motors 225. In one embodiment, the transition signal 312 is a pulse width modulation signal having a duty cycle that ranges from about 20 to 100 percent, where the motors 225 deliver full power when the duty cycle is 100 percent.

Figure 5:
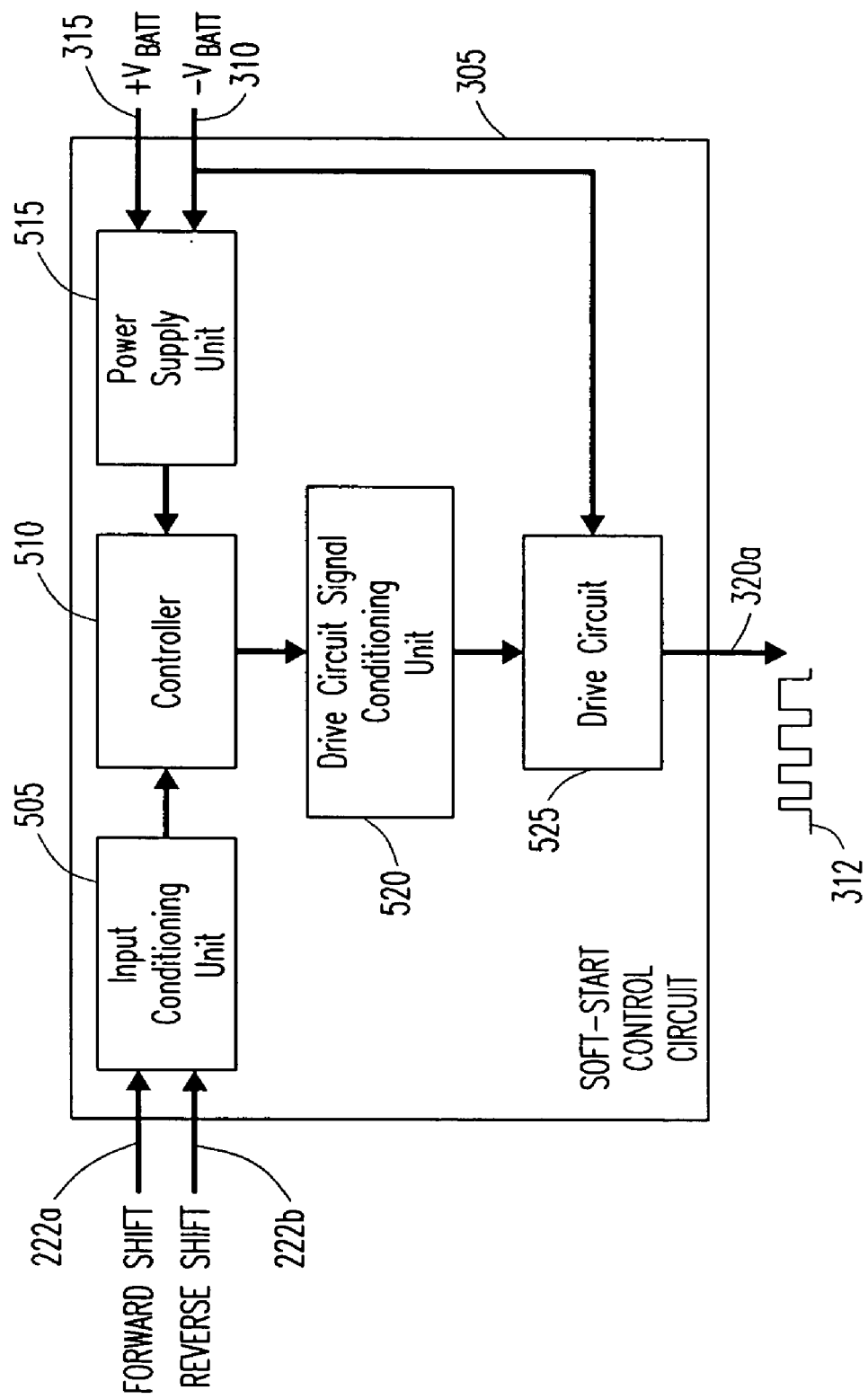
FIG. 5 is an exemplary block diagram of the soft-start control circuit of FIG. 3.

FIG. 5 is an exemplary block diagram 500 of an embodiment of the soft-start control circuit 305. The soft-start control circuit 305 includes an input conditioning unit 505, controller 510, power supply unit 515, drive circuit signal conditioning unit 520, and drive circuit 525. The power supply unit 515 is operable to receive the plus and minus (i.e., ground) battery voltage ($+V_{BATT}$ and $-V_{BATT}$) and generate a five-volt (+5V) supply for the other components of the soft-start control circuit 305. The input conditioning unit 505 is operable to receive the forward and reverse signals 222a and 222b, which may be analog or digital, and condition the signals for input to the controller 510. In an alternative embodiment, the soft-start control circuit 305 simply may be powered-up and begin performing the soft-start functionality (e.g., acceleration control). The controller 510 receives the conditioned forward and reverse signals for generating and applying the transition signal 312 to the return path 320a, which may be ramped and/or delayed based on the forward and reverse signals 222a and 222b. The controller 510 may utilize a processor that executes software to perform the logical decisions and generate the transition signal 312 based on an algorithm, for example. The software may be stored in ROM or other storage device to be read by the processor and executed thereby. The drive circuit signal conditioning unit 520 is operable to condition or prepare the output of the controller for the drive circuit 525. The drive circuit 525 operates to apply the transition signal 312 generated by the controller 510 to the low-side 230a and 230b of the motors 225.

Figure 6:
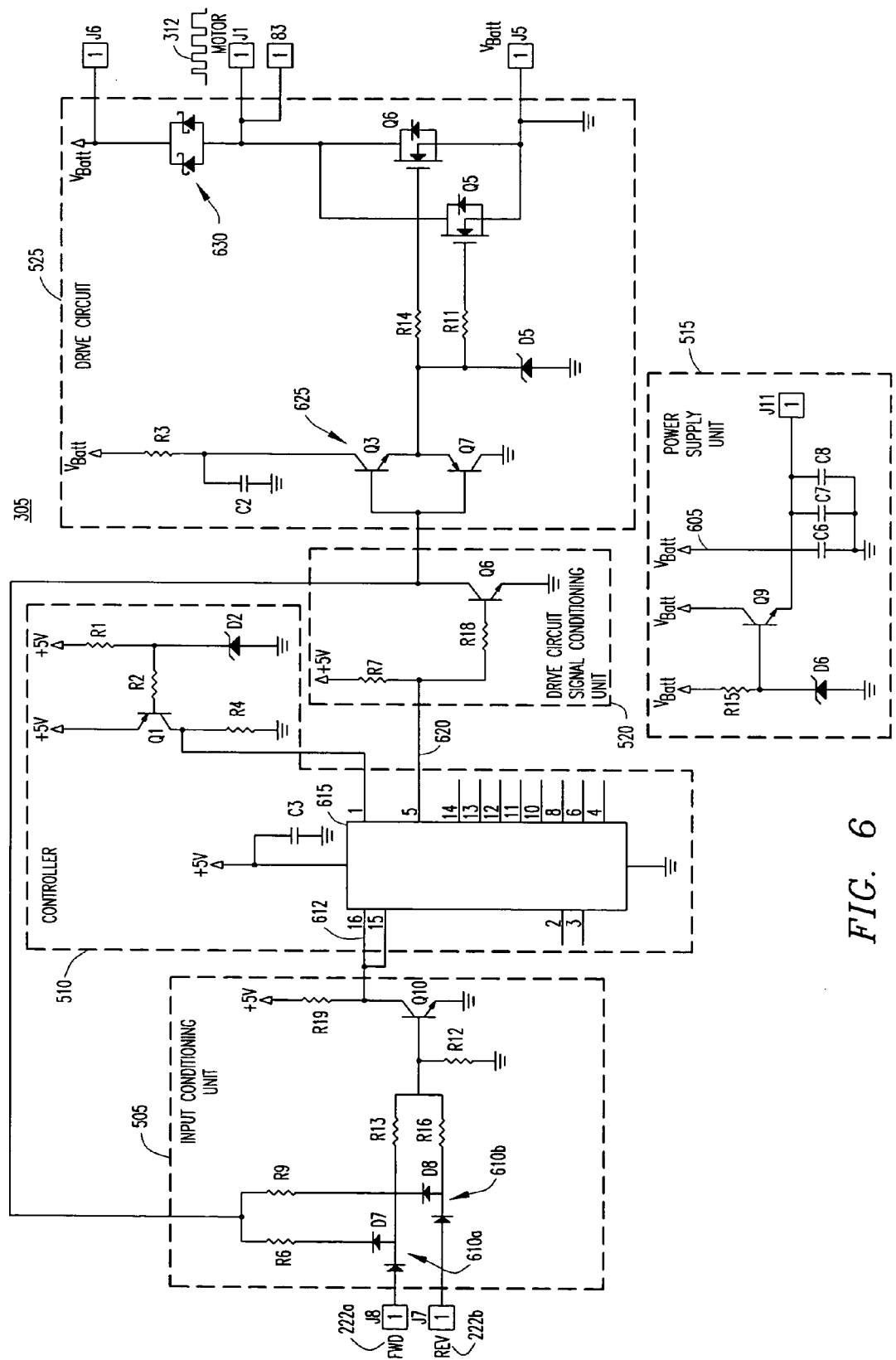
FIG. 6 is an exemplary schematic of the soft-start control circuit of FIGS. 3-5.

FIG. 6 is an exemplary schematic of an embodiment of the soft-start control circuit 305 of FIGS. 3-5. As shown, the schematic includes the input conditioning unit 505, controller 510, power supply unit 515, drive circuit signal conditioning unit 520, and drive circuit 525. The power supply unit 515 develops a five-volt source 605, which may be utilized by the input conditioning unit 505, controller 510, and drive circuit signal conditioning unit 520. The input conditioning unit 505 receives the forward and reverse signals 222a and 222b via connectors J8 and J7, respectively. Diodes 610a and 610b are utilized to protect other components of the input conditioning unit 505 and prevent false triggering of the soft-start control circuit 305. Additionally, the diodes 610a and 610b provide isolation of the forward and reverse signals 222a and 222b as one is high (e.g., positive) and the other low (e.g., negative). Alternatively, the two signals could be implemented as separate signals input to the processor. The forward and reverse signals 222a and 222b are logically OR'd to determine when at least one of the signals 222a and 222b is high. Upon determining that one of the forward 222a or reverse 222b signals is high, the transistor Q10 is utilized to generate a five-volt input signal to the controller 510.

The controller 510 includes a processor 615 that executes software to develop the transition signal to 312. The processor 615 receives the five-volt signal from Q10 to indicate that either the forward or reverse signal 222a and 222b is high. The processor 615 executes the software and outputs the appropriate transition signal 312 to the drive circuit signal conditioning unit 520 via line 620. The drive circuit signal conditioning unit 520 performs a level shift of the transition signal 312 via transistor Q8 in preparation for the drive circuit.

The drive circuit 525 includes a bridge circuit 625 formed of two transistors Q3 and Q7. The bridge circuit is operable to form a push-pull drive to turn field effect transistors (FETs) Q5 and Q6 on and off. The FETs Q5 and Q6, which may be part number IRL2203NS (one producer being International Rectifier, El Segundo, Calif. 90245), are used as high current switches that apply the pulse width modulation formed by the processor 615 between the motor 225 and negative terminal 227 of the battery 205. The Schottky diodes 630 operate as a "fly back" diodes that handle current feedback from the motors 225 due to the pulse width modulation of the motor 225 to prevent the FETs Q5 and Q6 from burning up.

Figure 7:
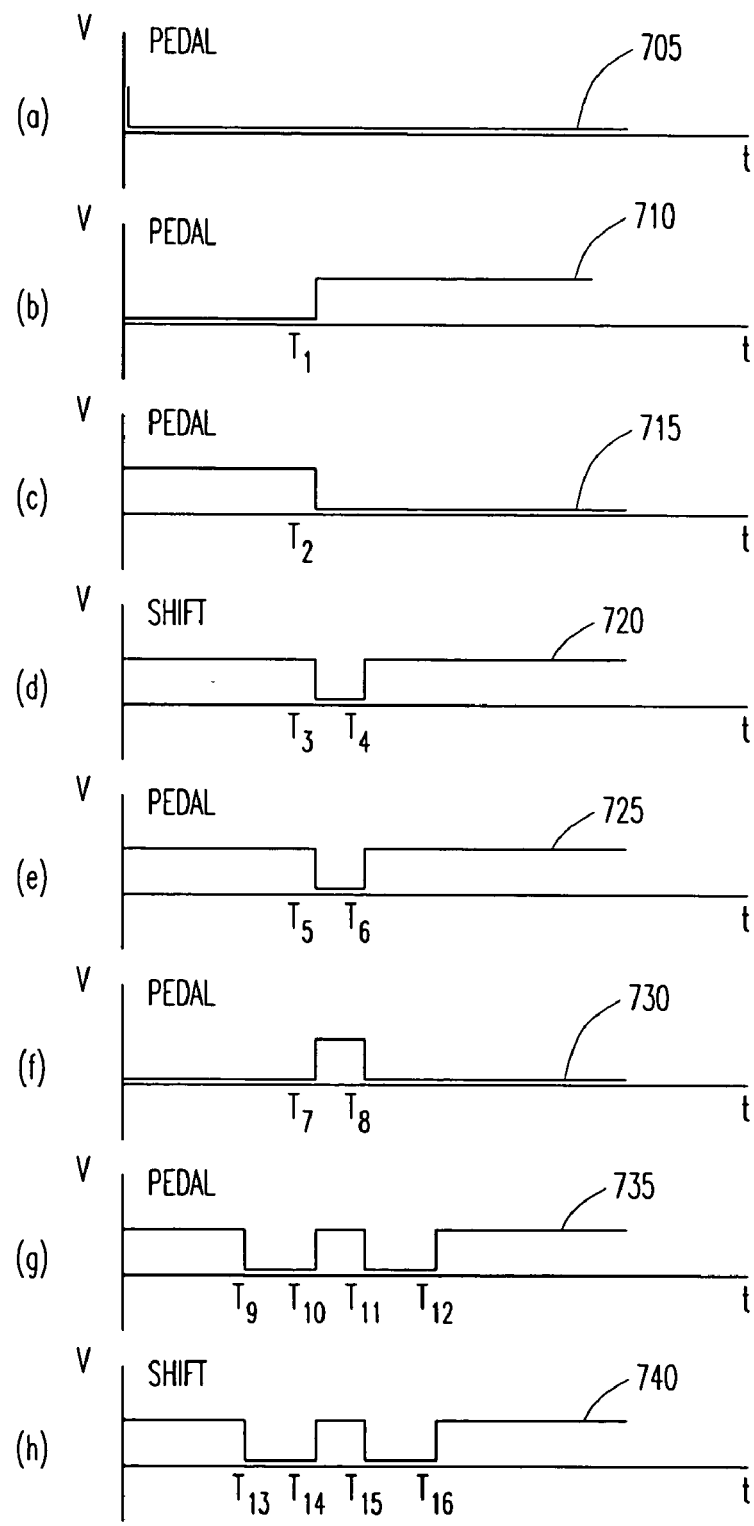
FIG. 7 provides eight exemplary conditioned input signals applied to the soft-start control circuit of FIG. 6.

FIG. 7 provides eight exemplary conditioned input signals 705-740 applied to the controller 510 via controller input line 612 based on the foot pedal and shift for changing direction. The conditioned input signals 705-740 are indicative of either pedal or forward/reverse shift operations of the toy vehicle 100. It should be understood that the toy vehicle 100 could have other functions or mechanisms that are utilized by the controller 510 to affect operation of the motors 225.

FIG. 7(a) provides conditioned input signal 705 that indicates that the toy vehicle 100 is off and that the pedal is not depressed, thereby causing the foot pedal switch 210 to remain open. FIG. 7(b) provides conditioned input signal 710 that indicates that the pedal is depressed at time T1, thereby causing the foot pedal switch 210 to close. FIG. 7(c) provides conditioned input signal 715 that indicates that the pedal is released at time T2, thereby causing the foot pedal switch 210 to open. FIG. 7(d) provides conditioned input signal 720 that indicates that a direction shift is initiated via a shift stick or other mechanism while the pedal is depressed, thereby causing the conditioned signal input to the controller 510 to toggle OFF at time T3 and back ON at time T4 so that the processor 615 recognizes that a shift occurs.

FIG. 7(*e*) provides conditioned input signal 725 that indicates that the pedal is momentarily released (e.g., foot slips off pedal), thereby causing the conditioned input signal 725 to toggle at times T5 and T6. FIG. 7(*f*) provides conditioned input signal 730 that indicates that the pedal is momentarily pressed (e.g., foot accidentally presses the pedal), thereby causing the conditioned input signal 730 to toggle at times T7 and T8. FIG. 7(*g*) provides conditioned input signal 735 that indicates that the pedal is being pulsed by the operator 110 of the toy vehicle 100, thereby causing the conditioned input signal 735 to toggle at times T9-T12. FIG. 7(*h*) provides conditioned input signal 740 that indicates that a direction shift is being pulsed by the operator 110 of the toy vehicle 100, thereby causing the conditioned input signal 740 to toggle at times T9-T12. Each of the conditioned input signals 705-740 are recognized by the soft-start control circuit 305 for providing the transition signal 312 to affect operation of the motors 225. In operation, the software program executing in the processor 615 may utilize the following algorithm to generate the transition signal 312 as a function of the conditioned input signal via line 612.

a. If conditioned input signal is LOW, then output is HIGH (drive circuit is OFF).

b. When the conditioned input signal transitions HIGH then

If off_time <off_time_max and on_time>on_time_max then DELAY(shift_delay)

Begin the PWM ramp from initial_ramp to 100 percent duty cycle

Figure 8A:
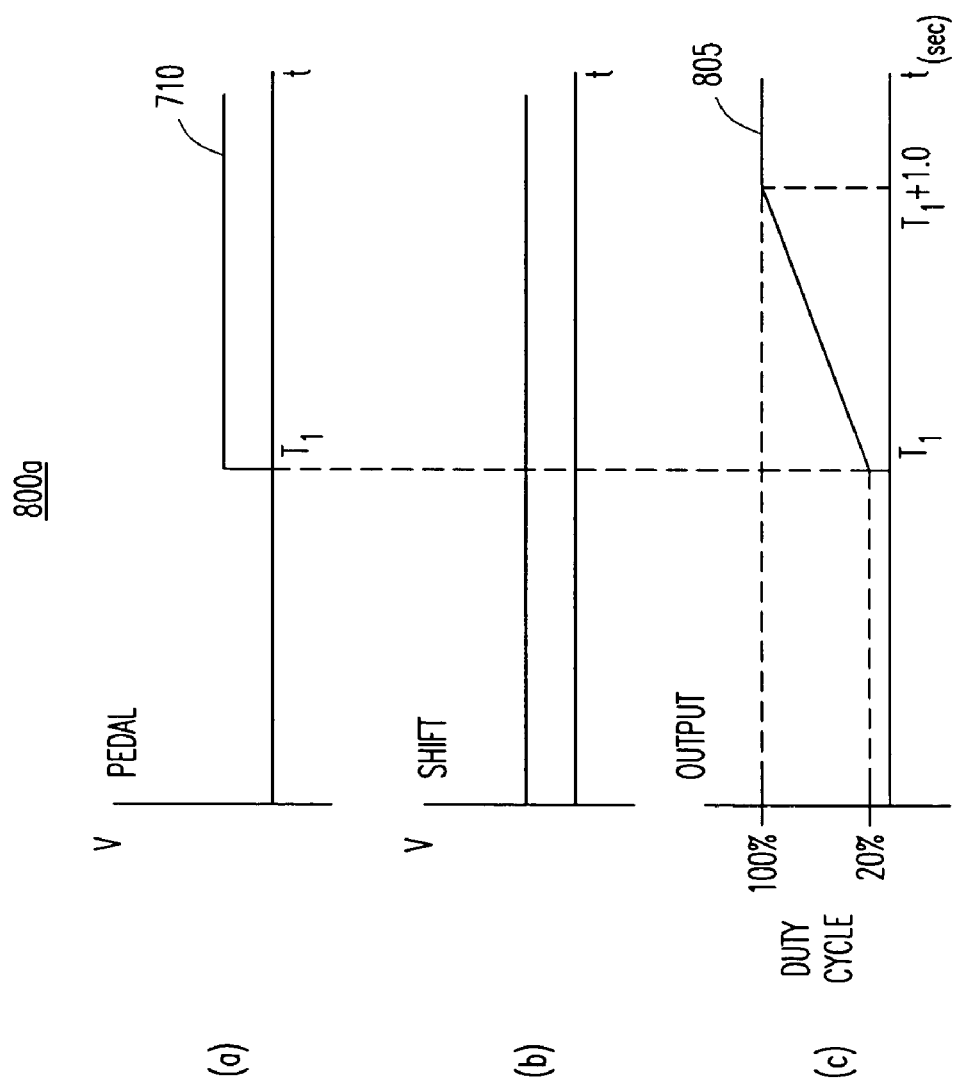
FIGS. 8A-8C are an exemplary set of graphs that show the response of the soft-start control circuit of FIG. 6 to a change of input conditions provided by the operator of the toy vehicle.

Output remains LOW until input changes c. While conditioned input signal HIGH, increment on_time d. While conditioned input signal LOW, increment off_time The parameters, which are exemplary, of the algorithm may be as follows:

ramp_time =1.0 seconds
initial_ramp =20 percent duty cycle
shift_delay =400 msec
off_time_max =125 msec
on_time_max =125 msec FIG. 8A is an exemplary set of graphs 800*a* that shows the response of an embodiment of the soft-start control circuit 305 to a change of input conditions provided by the operator 110 of the toy vehicle 100. Graph 8A(*a*) shows the conditioned input signal 710 transition at time $T_1$ due to the pedal being depressed by the operator 110, and graph 8A(*b*) shows that the forward/reverse switch 215 is not transitioned. Graph 8A(*c*) shows an output signal 805, which is indicative of the transition signal 312 having a duty cycle ranging from about 20 to 100 percent, that ramps up over a one second time duration (i.e., $T_1$ to $T_1$+1.0 second) based on the depression of the pedal at time $T_1$.

Figure 8B:
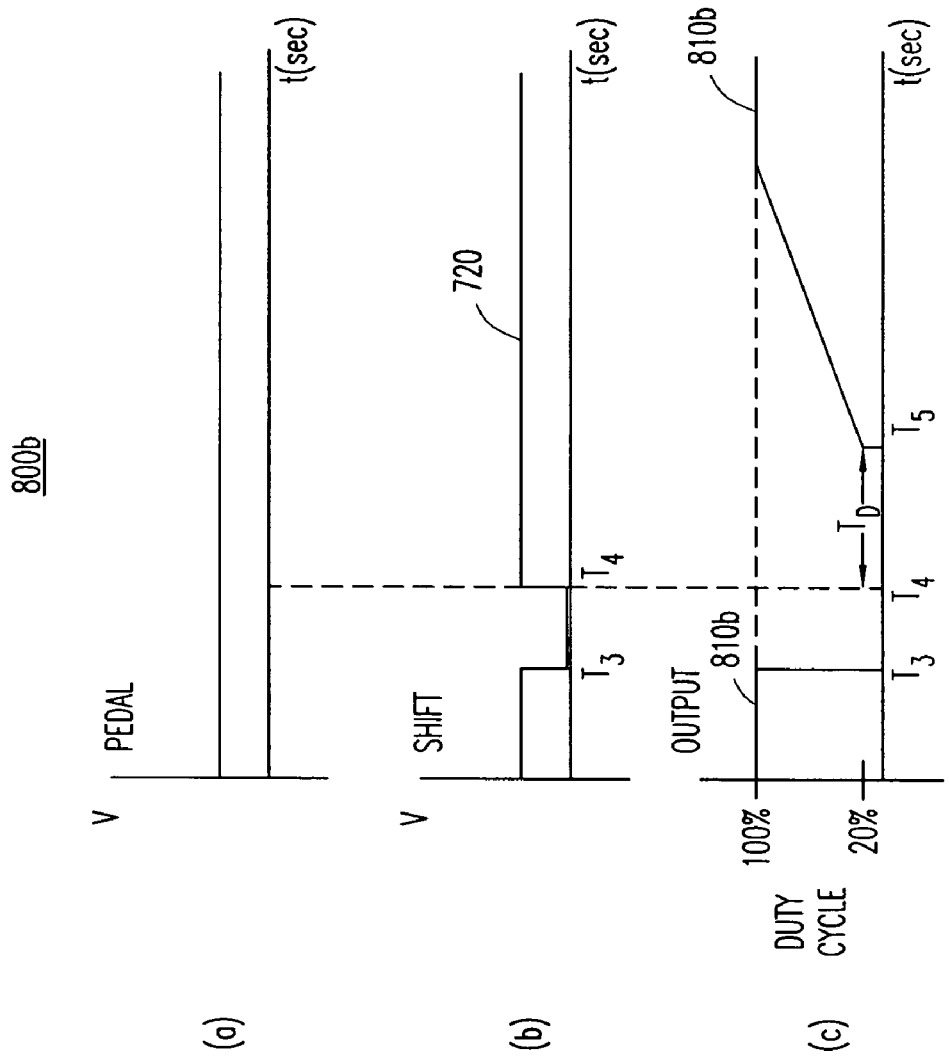

FIG. 8B is an exemplary set of graphs 800*b* that shows the response of the soft-start control circuit 305 to a change of input conditions provided by the operator 110 of the toy vehicle 100. Graph 8B(*a*) shows that the foot pedal switch 210 remains closed while the shift signal 720 changes (i.e., the operator 110 shifts from forward to reverse or vice versa). As shown, the output signal 810*a* transitions OFF at time $t_3$ in accordance with the shift signal 720 transitioning OFF. Upon the shift signal 720 transitioning HIGH at time $t_4$, a delay $t_D$ is created before the output signal 810*b* is enabled to provide the mechanical components (e.g., gear train) of the toy vehicle 100 enough time to transition, thereby avoiding wearing of the mechanical components.

Figure 8C:
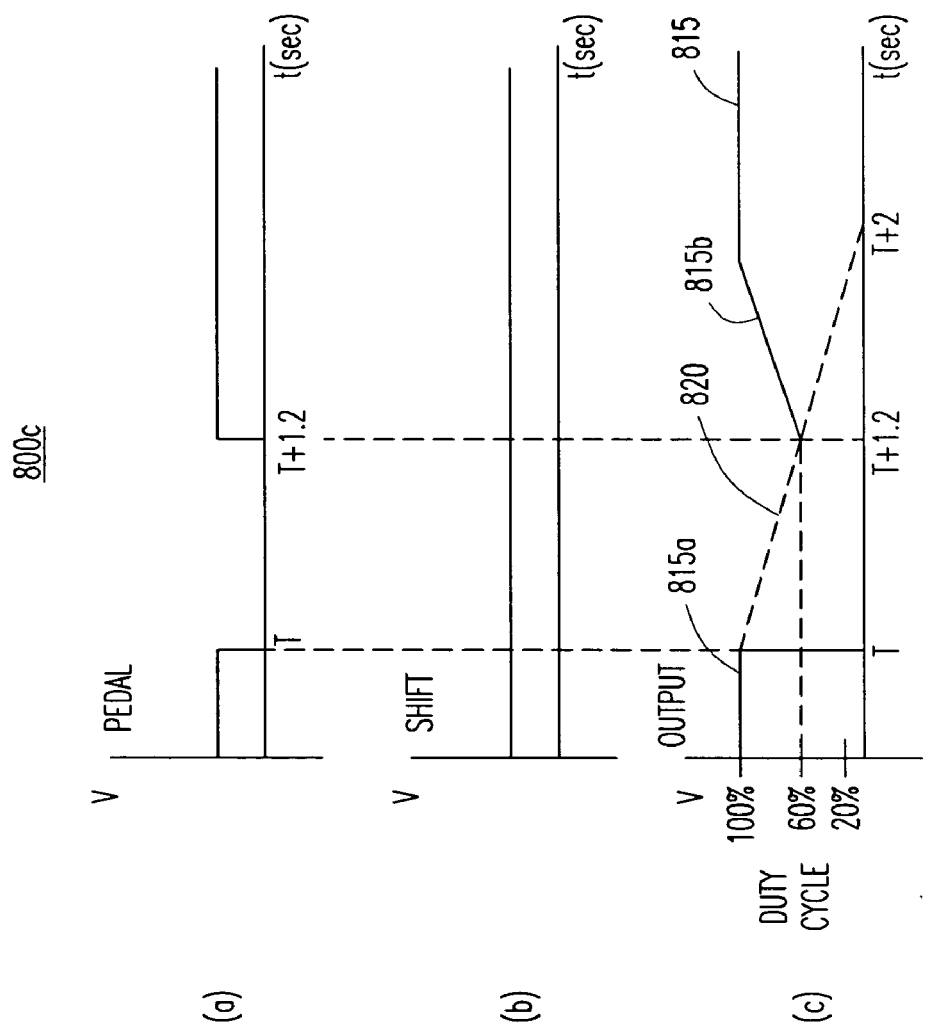

FIG. 8C is an exemplary set of graphs 800*c* that shows the response of the soft-start control circuit 305 to a change of input conditions provided by the operator 110 of the toy vehicle 100. As shown in graph 8C(*a*), the operator 110 releases the pedal at time T and re-engages the pedal at time T+1.2 seconds. Graph 8C(*b*) indicates that the shift is not transitioned over the time period of concern. The output signal 815*a* transitions OFF at time T and re-transitions ON at time T+1.2 seconds. During the OFF time of the output signal 815*a*, a deceleration counter identified by dashed line may count down for two seconds, for example, so that upon the operator 110 depressing the pedal again, output signal 815*b* may start at a higher duty cycle (e.g., 60 percent) and ramp to 100 percent rather than having to start at the startup duty cycle (e.g., 20 percent). By utilizing the deceleration counter, the toy vehicle 100 provides the operator 110 with a more realistic sense of operating a real vehicle. Additionally, by initiating the output signal 815*b* at a duty cycle closer to that of the velocity of the toy vehicle 100, safety may be improved as the toy vehicle 100 does not substantially slow. In the case of the toy vehicle 100 being a two-wheeled scooter or motorcycle-like, the deceleration counter safety feature the operator 110 not having to provide additional stability with his or her feet, which is often times awkward and difficult.

Figure 9:
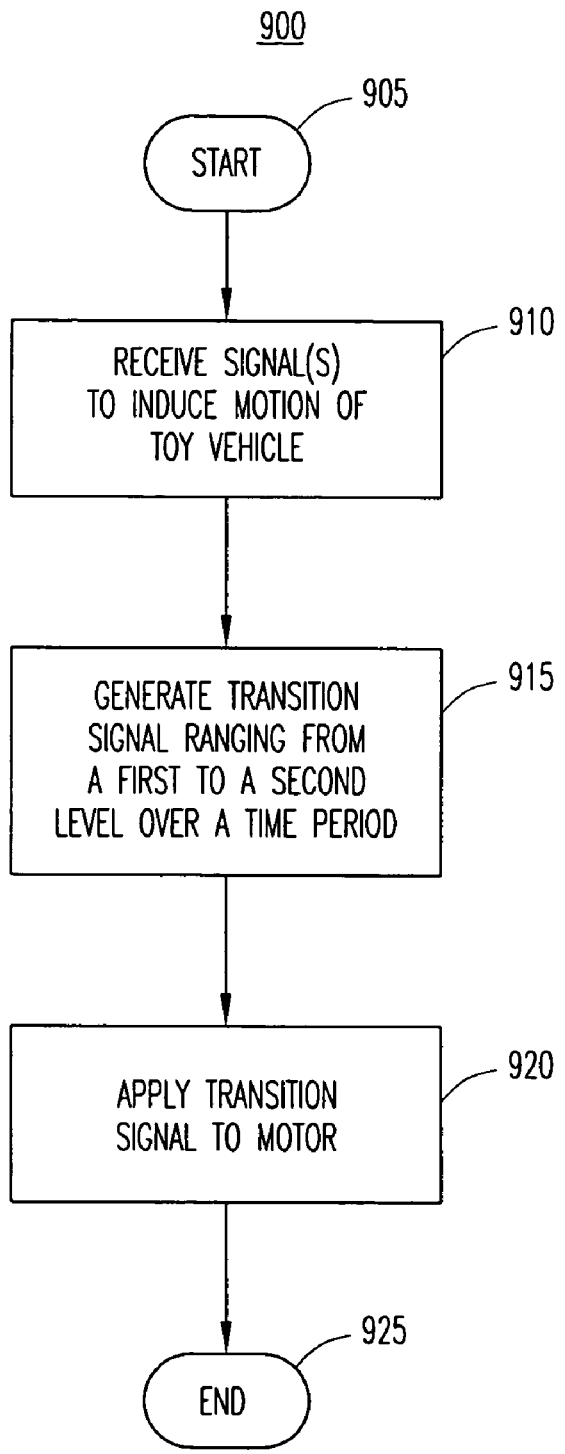
FIG. 9 is an exemplary flow diagram providing a high level operation of the soft-start control circuit of FIGS. 36.

FIG. 9 is an exemplary flow diagram 900 providing a high level operation of an embodiment of the soft-start control circuit 305 of FIGS. 3-5. The process starts at step 905. At step 910, at least one signal to induce motion of the toy vehicle 100 is received. The signal(s) may be that of a throttle signal or multiple signals, such as forward and reverse, that inherently indicate that the throttle signal has been applied. At step 915, a transition signal ranging from a first to a second level over a time period is generated. The transition signal may be a pulse width modulation signal having a duty cycle of approximately 20 percent and have a substantial linear increase to 100 percent. Alternatively, a non-linear signal, such as an exponential signal, may be generated to account for the dynamics of the motors 225, other electro-mechanical components, and/or the toy vehicle 100. The nonlinear signal may provide other benefits for the operator 110, such as a feeling of a turbo boost or thrusters, for example. At step 920, the transition signal is applied to the motor(s) 225. It should be understood that generation of the transition signal and application thereof may be performed simultaneously such that steps 915 and 920 may be considered more as a single step. The process ends at step 925.

Figure 10:
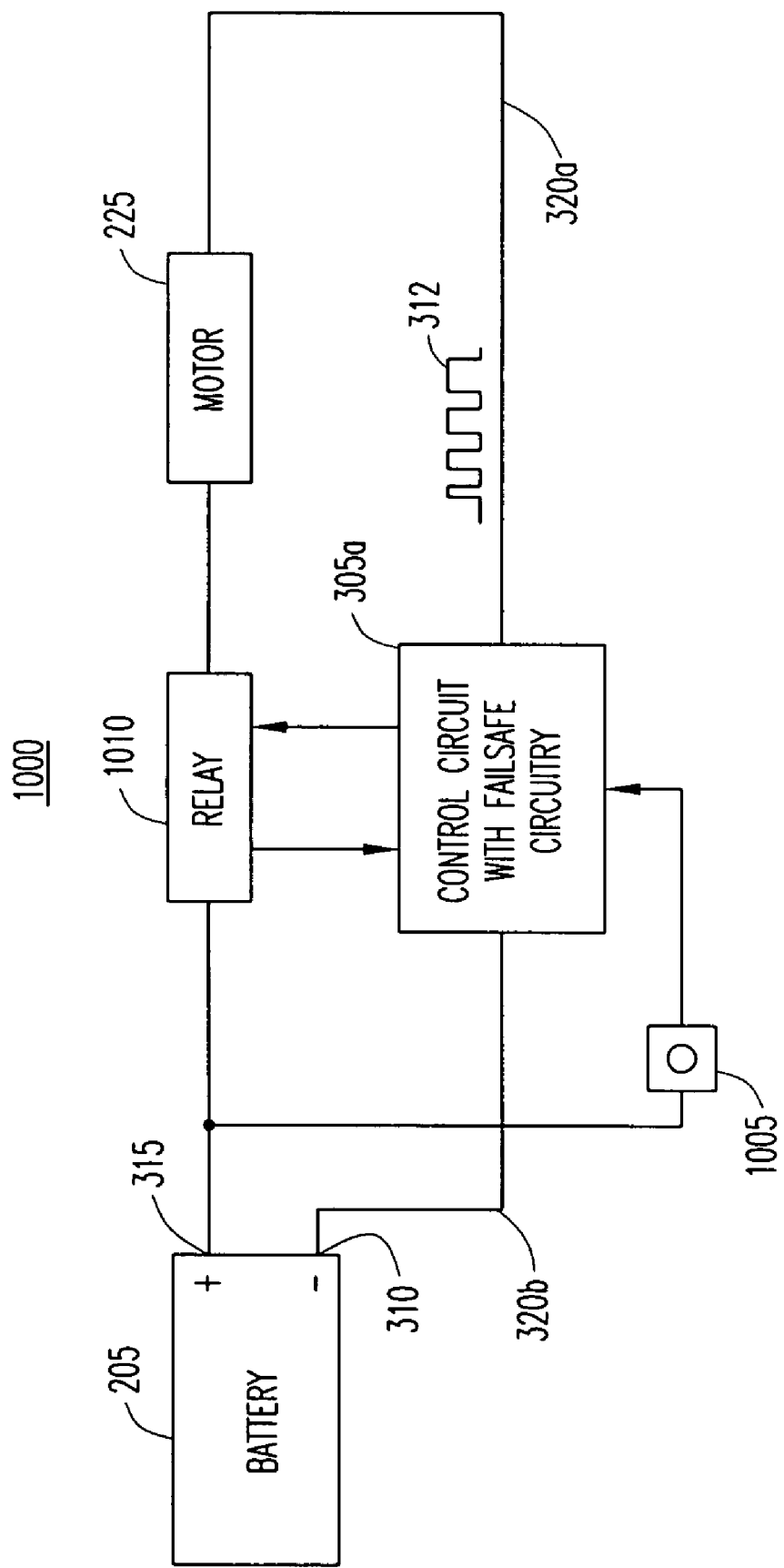
FIG. 10 is an exemplary block diagram of a control system of a toy vehicle of FIG. 1 that does not include a foot pedal.

FIG. 10 is an exemplary block diagram 1000 of a control system of a toy vehicle 100, such as a sit-on or stand-on scooter, that does not include a foot pedal. For safety reasons, toy makers are reluctant to deliver high power of the battery 205 to handle bars and, therefore, a low power switch 1005 is desirable to be located on the handle bars. Other switches, including switches that are disengaged upon the operator 110 becoming separated from the toy vehicle 100, may be utilized.

As shown, a relay 1010, which is normally closed to limit contact wear, is coupled to the control circuit with failsafe circuitry 305*a* to provide for a safe way to disengage the motor 225 from the battery 205 in the case of a control circuit failure. In other words, because the toy vehicle 100 does not have a foot pedal or other "make or break" safety switch and relies on the solid-state FETs to turn the motors 225 on and off, the relay 1010 is included as a safety feature to a control circuit failure (e.g., shorting or overheating of a FET). The control circuit 305a is in the return path 320a and 320b between the motor 225 and battery 205, however, the control circuit in the instant embodiment does not include the processor 615 to apply the transition signal 312 and basically operates as an on/off switch as the foot pedal switch 210. It should be understood that inclusion of the processor 615 and associated circuitry to provide the soft-start functionality could be integrated with the control circuit with failsafe circuitry 305a. Again, it should be understood that the control circuit with failsafe circuitry 305a may operate on the high-side of the motor 225, but that costs and complexity would be increased due to having to create higher voltages to switch the FETs ON.

Figure 11:
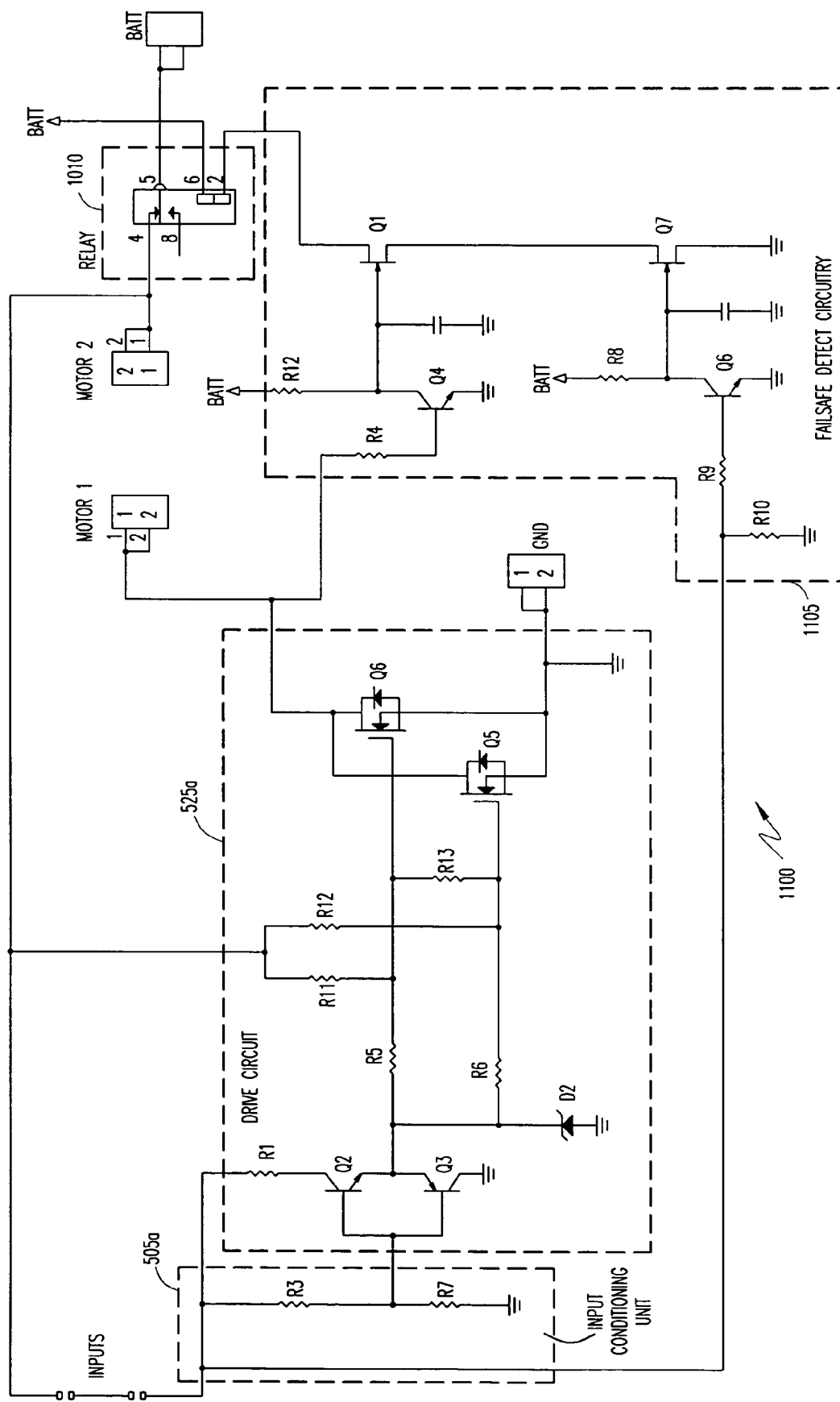
FIG. 11 is an exemplary schematic of a control circuit with failsafe circuitry of FIG. 10.

FIG. 11 is an exemplary schematic 1100 of an embodiment of the control circuit with failsafe circuitry 305a of FIG. 10. As shown, input conditioning unit 505a, drive circuit 525a, failsafe detect circuit 1105, and relay 1010 are provided. The failsafe detect circuitry 1105 detects if a failure occurs within the control circuitry (e.g., FETs Q5 or Q6 of the drive circuit 525a) and applies power to the relay 1010 to disengage the motor 225 from the battery 205. The failsafe detect circuitry 1105 includes circuitry, including transistors Q4, Q6, Q1, and Q7, that is configured to determine if a failure of the control circuit 305a occurs. If a failure of either FET Q5 or Q6 occurs by becoming shorted ON, for example, and the input is OFF, the failsafe detect circuitry 1105 determines that a failure has occurred and activates the relay 1010 to disengage the motor 225 from the battery 205. Although the failsafe detect circuitry 1105 is shown to be analog, it should be understood that the functionality of the failsafe detect circuitry 1105 could be digital by incorporating the functionality into software and executed on the processor 615, if included in the control circuit 305a, for example.

Figure 12:
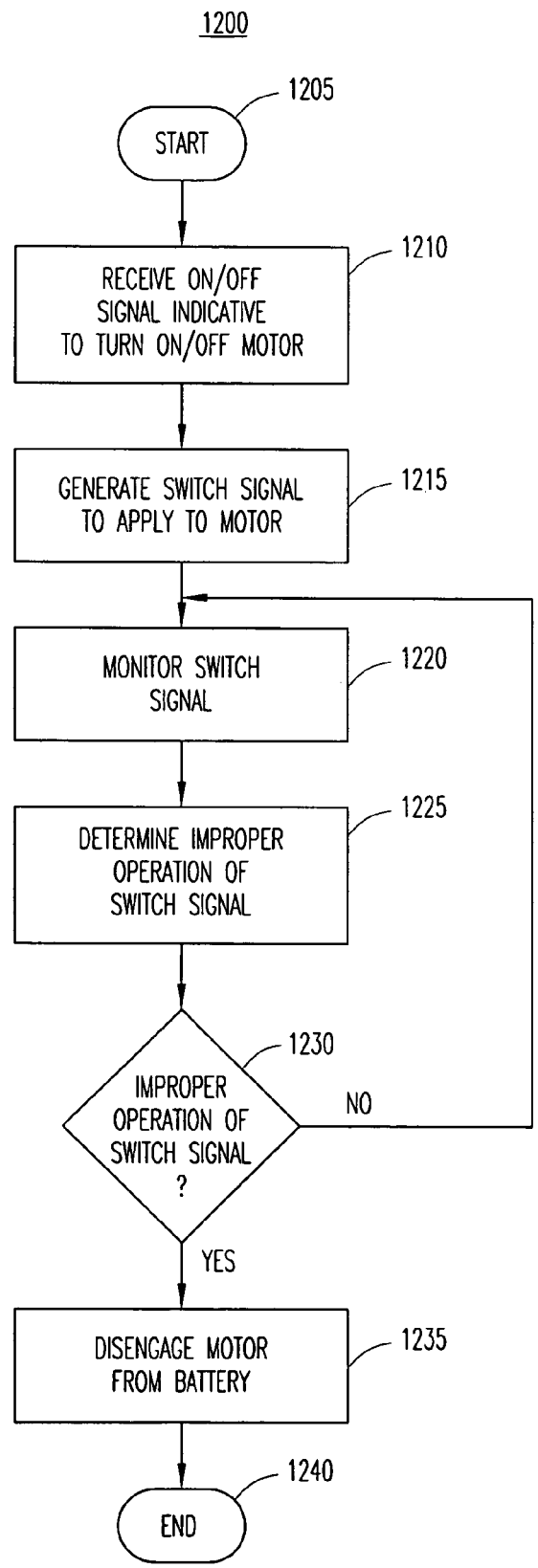
FIG. 12 is an exemplary flow diagram describing the failsafe operation of the control circuit with failsafe circuitry of FIGS. 10 and 11.

FIG. 12 is an exemplary flow diagram 1200 describing the failsafe operation of the control circuit with failsafe circuitry of FIGS. 10 and 11. The process starts at step 1205. At step 1210, a signal indicative of a desire of the operator 110 to turn on or off the motor 225 is received. A switch signal (e.g., signal substantially instantly switching from off to on) is generated by the control circuit 305a to be applied to the motor 225 at step 1215. The switch signal may be maintained at full voltage to continue applying full power to the motor 225 during operation of the toy vehicle 100. At step 1220, the switch signal is monitored. A determination of improper operation of the switch signal is made at steps 1225 and 1230. If an improper operation of the switch signal occurs, which indicates either (i) a failure of the control circuit 305a has occurred and/or (ii) the motor 225 is operating and the switch signal indicates that the motor 225 is to be off, then the motor 225 is disengaged from the battery at step 1235. Otherwise, the process repeats steps 1220 through 1230. It should be understood that is an indication is received to turn off or on the motor 225 during the monitoring of the switch signal, then the process may repeat from step 1205. The process ends at step 1240.

It should be understood that the principles of the present invention may not be limited to toy vehicles. Accordingly, the principles of the present invention could be applied to non-toy vehicles, such as golf carts or industrial vehicles.

The previous description is of a preferred embodiment for implementing the principles of the present invention, and the scope of the invention should not necessarily be limited by this description. The scope of the present invention is instead defined by the following claims.

What is claimed is:

1. A method for controlling acceleration of a toy vehicle configured to be operated by a person, said method comprising:
   detecting a change in a throttle signal from a first level to a second level or from the second level to the first level, the throttle signal operable to induce motion via a motor operating as a drive mechanism of the toy vehicle in response to a throttle switch controlled by a person in physical contact with the toy vehicle, wherein the first level corresponds to the throttle signal produced when the person engages the throttle switch, and wherein the second level corresponds to the throttle signal produced when the person disengages the throttle switch;
   generating a transition signal based on the change in the throttle signal, the transition signal comprising at least one signal level intermediate to a third signal level corresponding to the first level and a fourth signal level corresponding to the second level, wherein a transition from the third signal level to the at least one intermediate signal level to the fourth signal level occurs over a significantly longer time period than a time period for the change in the throttle signal from the first level to the second level; and
   applying the transition signal to affect operation of the motor.

2. The method according to claim 1, wherein the transition signal comprises a pulse width modulation signal having a plurality of different duty cycles, each different duty cycle comprising a signal level of the transition signal.

3. The method according to claim 1, wherein the motor includes a high and low terminal, the transition signal being applied to the low terminal of the motor.

4. The method according to claim 1, wherein the operation of the motor comprises a substantially linear transition from a first angular velocity to a second angular velocity.

5. The method according to claim 1, wherein the transition signal ramps power to the motor.

6. The method according to claim 1, wherein the operation of the motor comprises a non-linear transition from a first angular velocity to a second angular velocity.

7. The method according to claim 1, wherein the change in the throttle signal from the first level to the second level comprises a binary step function and the transition of the transition signal occurs over a time span of at least one second.

8. The method according to claim 1, further comprising:
   receiving a shift signal indicative of an activation of a control for changing a direction of motion for the toy vehicle;
   responsive to the shift signal and if power is being applied to the motor,
      initiating a delay; and
      applying the transition signal to the motor.

9. The method of claim 1 wherein activation and deactivation of the throttle are each determined by actions of a person.

10. The method according to claim 2, wherein the pulse width modulation ranges from approximately a 20 percent to approximately a 100 percent duty cycle.

11. A computer-readable medium having stored thereon sequences of instructions, wherein the sequences of instructions include instructions, when executed by a processor, that cause the processor to:
   detect a change in a throttle signal from a first level to a second level or a second level to a first level, the throttle signal operable to induce motion via a motor operating as a drive mechanism of the toy vehicle in response to a switch controlled by a person in physical contact with the toy vehicle, wherein the first level corresponds to the throttle signal produced when the person engages the throttle switch, and wherein the second level corresponds to the throttle signal produced when the person disengages the throttle switch;

generate a transition signal based on the change in the throttle signal, the transition signal comprising at least one signal level intermediate to a third signal level corresponding to the first level and a fourth signal level corresponding to the second level, wherein a transition from the third signal level to the at least one intermediate signal level to the fourth signal level occurs over a significantly longer time period than a time period for the change in the throttle signal from the first level to the second level; and apply the transition signal to effect operation of a motor operating within a toy vehicle.

12. The computer readable medium of claim 11, wherein the transition signal comprises a pulse width modulation signal having a plurality of different duty cycles, each different duty cycle comprising a signal level of the transition signal.

13. The computer readable medium of claim 11, wherein the motor includes a high and low terminal, the transition signal being applied to the low terminal of the motor.

14. The computer readable medium of claim 11, wherein the operation of the motor comprises a substantially linear transition from a first angular velocity to a second angular velocity.

15. The computer readable medium of claim 11, wherein the transition signal ramps power to the motor.

16. The computer readable medium of claim 11, wherein the operation of the motor comprises a non-linear transition from a first angular velocity to a second angular velocity.

17. The computer readable medium of claim 11, wherein the change in the throttle signal from the first level to the second level comprises a binary step function and the transition of the transition signal occurs over a time span of at least one second.

18. The computer readable medium of claim 11, wherein the instructions further cause the processor to:
receive a shift signal indicative of an activation of a control for changing a direction of motion for the toy vehicle;
if power is being applied to the motor,
initiate a delay; and
apply the transition signal to the motor.

19. The computer readable medium of claim 11, wherein the instructions further cause the processor to:
detect a change in the throttle signal from the second level to the first level followed by a second change in the throttle signal from the first level to the second level within a predetermined time;
generate a second transition signal in response to detecting the second change within the predetermined time of detecting the change from the second level to the first level, the second transition signal operable to ramp up power to the motor starting from a power level that depends on a time duration between the change from the second level to the first level and the second change.

20. The computer readable medium of claim 12, wherein the pulse width modulation ranges from approximately a 20 percent to approximately a 100 percent duty cycle.

21. The computer readable medium of claim 19, wherein the power to the motor is ramped up by increasing a duty cycle of a pulse width modulation.

22. A method for controlling acceleration of a toy vehicle configured to be operated by a person, the method comprising:
detecting a binary throttle signal produced when a person in physical contact with the toy vehicle engages a throttle switch, wherein the binary throttle signal is not produced when the person disengages the throttle switch, and wherein the binary throttle signal is operable to induce motion using a motor operating as a drive mechanism of the toy vehicle;
generating a transition signal based on the binary throttle signal to cause a delay in applying to the motor a power level associated with the binary throttle signal; and
applying power to the motor in accordance with the transition signal.

23. The method of claim 22 wherein the binary throttle signal is generated by a binary switch.

24. The method of claim 22 wherein the power level associated with the binary throttle signal comprises a second power level and generating a transition signal comprises generating a transition signal operable to increase power applied to the motor over a period of time from a first power level to the second power level.

25. The method of claim 22 wherein generating a transition signal comprises delaying applying power to the motor in response to a shift signal for changing a direction of motion for the toy vehicle.

26. The method of claim 22 wherein:
detecting the binary throttle signal comprises detecting a change, within a predetermined time period, from a high signal to a low signal followed by a change from the low signal to the high signal, the low signal operable to remove power from the motor;
the power level associated with the binary throttle signal comprises a second power level and the second power level is associated with the high signal; and
generating a transition signal comprises generating a transition signal operable to increase power applied to the motor over a period of time from a first power level to the second power level, wherein the first power level depends upon an amount of time between the change from the high signal to the low signal and the change from the low signal to the high signal.

27. The method of claim 22 wherein the power level associated with the binary throttle signal comprises a voltage with a one hundred percent duty cycle.

28. The method of claim 24 wherein the transition signal comprises a pulse width modulated signal.

29. The method of claim 28 wherein the first power level corresponds to a twenty percent duty cycle level of the transition signal and the second power level corresponds to a one hundred percent duty cycle level of the transition signal.

30. The method of claim 26 wherein the first power level is determined in accordance with an algorithm that decreases the first power level with increasing amounts of time between the change from the high signal to the low signal and the change from the low signal to the high signal.

31. The method of claim 30 wherein the algorithm calculates the first power level using a linear decay from a one hundred percent duty cycle to a twenty percent duty cycle.

32. An article comprising a machine-readable medium storing instructions for causing data processing apparatus to perform operations comprising:

detecting an activation of a binary throttle signal produced when a person in physical contact with the toy vehicle engages a throttle switch, wherein the binary throttle signal is not produced when the person disengages the throttle switch, and wherein the activation of the binary throttle signal is operable to induce motion using a motor operating as a drive mechanism of a toy vehicle;

generating a transition signal in response to detecting the activation level of the binary throttle signal to cause a delay in applying to the motor a maximum power level associated with the activation level of the binary throttle signal; and applying power to the motor in accordance with the transition signal.

33. The article of claim 32 wherein the binary throttle signal is generated by a binary switch.

34. The article of claim 32 wherein generating a transition signal to cause a delay in applying to the motor a maximum power level comprises generating a transition signal operable to increase power applied to the motor over a period of time from a first power level to the maximum power level.

35. The article of claim 32 wherein generating a transition signal to cause a delay in applying to the motor a maximum power level comprises delaying applying power to the motor in response to a shift signal operable to effect a change in a direction of motion for the toy vehicle.

36. The article of claim 32 wherein the instructions further cause data processing apparatus to perform operations comprising:

detecting a change in the binary throttle signal from the activation level to a deactivation level followed, within a predetermined time period, by a change from the deactivation level to the activation level, the deactivation level operable to remove power from the motor; and wherein generating a transition signal to cause a delay in applying to the motor a maximum power level comprises generating a transition signal operable to increase power applied to the motor over a period of time from a first power level to the maximum power level, wherein the first power level depends upon an amount of time between the change from the activation level to the deactivation level and the change from the deactivation level to the activation level.

37. The method of claim 32 wherein:

the power level associated with the activation level of the binary throttle signal comprises a direct current voltage; and applying power to the motor in accordance with the transition signal comprises applying a pulse width modulated voltage with an increasing duty cycle to the motor.

38. The article of claim 34 wherein the transition signal comprises a pulse width modulated signal.

39. The article of claim 36 wherein the first power level is determined in accordance with an algorithm that provides a decreasing first power level with increasing amounts of time between the change from the activation level to the deactivation level and the change from the deactivation level to the activation level.

40. The article of claim 39 wherein the algorithm provides a linearly decreasing first power level with increasing amounts of time between the change from the activation level to the deactivation level and the change from the deactivation level to the activation level.

* * * * *